(12) United States Patent
Nakamoto (10) Patent No.: US 8,186,190 B2
(45) Date of Patent: May 29, 2012

(54) KEY DEVICE

(75) Inventor: Yuji Nakamoto, Aichi-ken (JP)

(73) Assignee: Kabushiki Kaisha Tokai-Rika-Denki-Seisakusho, Aichi-ken (JP)

(*) Notice: Subject to any disclaimer, the term of this patent is extended or adjusted under 35 U.S.C. 154(b) by 107 days.

(21) Appl. No.: 12/695,949

(22) Filed: Jan. 28, 2010

(65) Prior Publication Data

US 2010/0192645 A1 Aug. 5, 2010

(30) Foreign Application Priority Data

Feb. 3, 2009 (JP) ................. 2009-022913

(51) Int. Cl.
*B60R 25/02* (2006.01)
*F16C 3/00* (2006.01)
*G05G 5/00* (2006.01)

(52) U.S. Cl. ............... 70/186; 70/182; 70/183; 70/184; 70/185; 70/252

(58) Field of Classification Search ............. 70/182, 70/183, 184, 185, 186, 252
See application file for complete search history.

(56) References Cited

U.S. PATENT DOCUMENTS

| 5,065,604 A * | 11/1991 | Pattock ......................... 70/239 |
| 5,504,468 A * | 4/1996 | Hattori et al. ................. 335/278 |
| 5,685,183 A * | 11/1997 | Hattori et al. .................. 70/252 |
| 6,427,503 B2 * | 8/2002 | Kataumi et al. ................ 70/247 |
| 6,881,173 B2 * | 4/2005 | Harada et al. .................. 477/99 |
| 7,267,018 B2 * | 9/2007 | Kai ............................. 73/865.8 |
| 7,762,110 B2 * | 7/2010 | Tsukazaki ..................... 70/186 |
| 2003/0233991 A1 | 12/2003 | Harada et al. |

FOREIGN PATENT DOCUMENTS

JP  2000-229557 A  8/2000

OTHER PUBLICATIONS

European Search Report dated Jun. 4, 2010 from corresponding European Patent Application No. EP 10 00 0857.

* cited by examiner

*Primary Examiner* — Suzanne Barrett
*Assistant Examiner* — David E Sosnowski
(74) *Attorney, Agent, or Firm* — Roberts Mlotkowski Safran & Cole P.C.

(57) ABSTRACT

A regulating member, an allowing member and an urging member are easily assembled to a subject to which these members are assembled. When assembling of an interlock unit is carried out, with a fitting convex portion of a link being fitted into a fitting concave portion of a release link, a torsion spring (particularly, a connecting portion) is temporarily elastically deformed, and a pair of spiral portions of the torsion spring are mounted to spring holding shafts of the link and the release link, respectively. As a result, the link, the release link and the torsion spring can be brought into a temporarily assembled state, and can be easily assembled to a unit box.

14 Claims, 9 Drawing Sheets

KEY DEVICE

CROSS-REFERENCE TO RELATED APPLICATION

This application claims priority under 35 USC 119 from Japanese Patent Application No. 2009-022913, the disclosure of which is incorporated by reference herein.

BACKGROUND OF THE INVENTION

1. Technical Field

The present invention relates to a key device that regulates rotation of a key.

2. Related Art

There are key devices in which when a lifter is rotated by rotation of a key knob to an "ACC position", a lock plate does not rotate together with the lifter, thereby causing rotation of the key knob to the "ACC position" to be regulated, while rotation of the key knob to the "ACC position" is permitted due to the lock plate being rotated together with the lifter (for example, refer to Japanese Patent Application Laid-Open (JP-A) No. 2000-229557).

In such key device as described above, the lifter and the lock plate are supported by a support shaft in a rotatable manner, and a torsion spring is provided at the support shaft.

However, in the key device, it is necessary to assemble separately the lifter, the lock plate and the torsion spring to the support shaft. For this reason, it is difficult to assemble and mount the lifter, the lock plate and the torsion spring on the support shaft (a subject on which these components are assembled and mounted).

SUMMARY OF THE INVENTION

In view of the aforementioned circumstances, an object of the present invention is to provide a key device that makes it possible to easily assemble an allowing member, a regulating member and an urging member on a subject to be assembled.

A key device according to a first aspect of the present invention includes: a rotating member that is rotated by rotation of a key; an allowing member that is rotated by the rotating member when the rotating member is rotated to a predetermined rotational position; a regulating member disposed at one side of the allowing member, that regulates rotation of the rotating member to the predetermined rotational position by not being rotated together with the allowing member when the rotating member is rotated to the predetermined rotational position, and that allows rotation of the rotating member to the predetermined rotational position by being rotated together with the allowing member when the rotating member is rotated to the predetermined rotational position; a pair of holding portions that protrude toward another side of the allowing member and toward one side of the regulating member, respectively; and an urging member having urging force, that causes the allowing member and the regulating member to be assembled by being held by the pair of holding portions.

In a key device according to a second aspect of the present invention in the first aspect, the allowing member and the regulating member are rotatable against the urging force of the urging member.

A key device according to a third aspect of the present invention further includes, in the key device of the first aspect or second aspect, guiding portions provided at the holding portions, that guide the urging member to the pair of holding portions so that the urging member is held by the holding portions.

A key device according to a fourth aspect of the present invention further includes, in the key device of any one of the first, the second or the third aspects, a fitting portion that allows the allowing member and the regulating member to fit with each other such that the allowing member and the regulating member are relatively rotatable.

A key device according to a fifth aspect of the present invention further includes, in the key device described in any one of the first, the second, the third and the fourth aspects, protruding portions provided in a subject to which the allowing member, the regulating member and the urging member are assembled, that respectively protrude toward the holding portions to hold the urging member.

In a key device according to a sixth aspect of the present invention in the key device of any one of the first to fifth aspects, the pair of holding portions are formed at the allowing member and the regulating member, respectively.

In a key device according to a seventh aspect of the present invention in the key device of the fourth aspect, the fitting portion includes a fitting concave portion that is formed at one of the allowing member or the regulating member and a fitting convex portion that is formed at the other of the allowing member or the regulating member, and the fitting concave portion and the fitting convex portion are fitted to each other.

In a key device according to an eighth aspect of the present invention in the key device of any one of the first to fifth aspects, the pair of holding portions are formed at one of the allowing member or the regulating member.

In a key device according to a ninth aspect of the present invention in the key device of the fourth aspect, the pair of holding portions are formed at one of the allowing member or the regulating member, and the fitting portion is a fitting hole that is formed at the other of the allowing member or the regulating member, and the fitting hole and one of the pair of holding portions are fitted to each other.

In a key device according to a tenth aspect of the present invention in the key device of any one of the first to fifth aspects, the urging member includes a pair of holding members, and the pair of holding members are respectively held at the pair of holding portions.

In the key device of the first, the sixth, the eighth or the tenth aspects, the sixth aspect the rotating member is rotated by rotation of a key, and when the rotating member is rotated to the predetermined rotational position, the allowing member is rotated by the rotating member. Further, the regulating member is disposed at one side of the allowing member.

Moreover, when the rotating member is rotated to the predetermined rotational position, the regulating member is not rotated together with the allowing member, whereby the regulating member regulates rotation of the rotating member to the predetermined rotational position, so as to regulate rotation of the key. On the other hand, when the rotating member is rotated to the predetermined rotational position, the regulating member is rotated together with the allowing member, whereby the regulating member allows the rotating member to rotate to the predetermined rotational position, so as to allow rotation of the key.

Here, the pair of holding portions protrude toward another side of the allowing member and toward one side of the regulating member. Further, the urging member has urging force, and is held by the pair of holding portions, so as to allow assembling of the allowing member and the regulating member. For this reason, the allowing member, the regulating member and the urging member can be brought into a temporarily assembled state and they can also be easily assembled to a subject to which these members are assembled.

In the key device of the second aspect, the allowing member and the regulating member are made rotatable against the urging force of the urging member. For this reason, the allowing member and the regulating member are allowed to return initial position by means of the urging force of the urging member.

In the key device of the third aspect, the guiding portions provided in the pair of holding portions guide to hold the urging member in the pair of holding portions. For this reason, the urging member can be easily held by the pair of holding portions.

In the key device of the fourth, the seventh or the ninth aspects, the allowing member and the regulating member are fitted with each other by the fitting portion in relatively rotatable manner. For this reason, cancellation of the state in which the allowing member, the regulating member and the urging member are temporarily assembled can be effectively suppressed.

In the key device of the fifth aspect, the protruding portions provided in the subject to which the allowing member, the regulating member and the urging member are assembled protrude toward the holding portions, and hold the urging member. For this reason, when the allowing member, the regulating member and the urging member are assembled to the subject to which these members are assembled, it is possible to suppress cancellation of the state in which the urging member is held.

BRIEF DESCRIPTION OF THE DRAWINGS

Embodiments of the invention will be described in detail with reference to the following figures, wherein.

DETAILED DESCRIPTION OF THE INVENTION

First Embodiment

Figure 6:
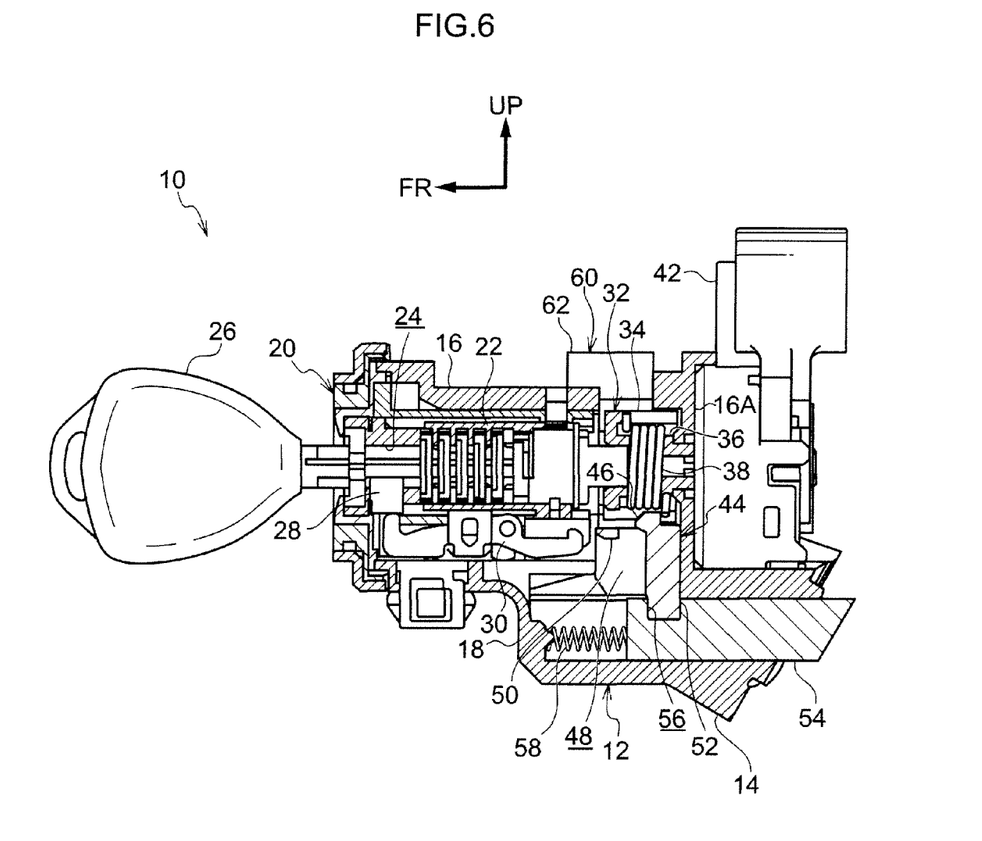
FIG. 6 is a cross sectional view showing the steering lock device according to the first exemplary embodiment of the present invention, when seen from the left side.

FIG. 6 shows a cross sectional view of a steering lock device 10 that serves as a key device according to a first exemplary embodiment of the present invention when seen from the left side. In the drawings, the front side of the steering lock device 10 is indicated by arrow FR, the upper side of the steering lock device 10 is indicated by arrow UP, and the right side of the steering lock device 10 is indicated by arrow RH.

As shown in FIG. 6, the steering lock device 10 according to the present exemplary embodiment is equipped with a lock body 12 that serves as an accommodating member, and a fixed piece 14 (see FIG. 5) having a substantially semi-cylinder shape is formed at the rear end of the lower side portion of the lock body 12. The bracket (not shown in the drawings) having a substantially semi-cylinder shape is mounted to the fixed piece 14. A steering post (not shown in the drawings) of a vehicle is fitted in an inner portion of the bracket and the fixed piece 14, whereby the lock body 12 is fixed to the steering post, and the steering lock device 10 is mounted to the steering post.

A substantially cylinder shaped accommodating cylinder 16 is formed at the upper side portion of the lock body 12, and a rear wall 16A is formed at the rear end of the accommodating cylinder 16. A lock cylinder 18 having a substantially rectangular tube shape is formed at the lower side of the rear side portion of the accommodating cylinder 16, and the respective inner sides of the accommodating cylinder 16 and the lock cylinder 18 communicate with each other. The front surface of the lock cylinder 18 is closed, and the rear surface of the lock cylinder 18 is opened toward the rear side via the fixed piece 14.

A substantially circular cylinder (column) shaped ignition cylinder 20 that serves as a key cylinder is accommodated within the accommodating cylinder 16. The front end of the ignition cylinder 20 is made to protrude from the front end of the accommodating cylinder 16 to the front side. The front end of the ignition cylinder 20 is disposed in an instrument panel (not shown in the drawings) of a vehicle, and the front surface of the ignition cylinder 20 is directed from the instrument panel to the interior of the vehicle.

A key rotor 22 having a substantially circular cylinder (column) shape and serving as an insert member is accommodated in the ignition cylinder 20, and front side movement of the key rotor 22 is stopped (not allowed). An insertion hole 24 having a rectangular pillar shape is formed within the key rotor 22, and the insertion hole 24 is opened from the front surface of the key rotor 22.

The key rotor 22 is arranged at a "LOCK" position that serves as a predetermined rotational position, and an ignition key 26 (a regular key) serving as a key can be inserted in and pulled out from the insertion hole 24. By the ignition key 26 being inserted in the insertion hole 24 and operated to rotate, the key rotor 22 can be rotated in the ignition cylinder 20, whereby the key rotor 22 can be arranged at the "ACC" position, "ON" position or "START" position. Further, only when the key rotor 22 is arranged at the "LOCK" position, the ignition key 26 can be inserted in and pulled out from the insertion hole 24, and when the key rotor 22 is arranged at the "ACC" position, "ON" position or "START" position, the operation of the ignition key 26 being inserted in and pulled out from the insertion hole 24 is regulated.

A slide piece 28 having a substantially U-shaped framelike configuration is provided in the lower portion of the front portion of the key rotor 22 so as to be movable in the vertical (upper and lower) direction (in the radial direction of the key rotor 22). The lower side surface (the outer side surface in the radial direction of the key rotor 22) of the slide piece 28 abuts against the inner peripheral surface of the ignition cylinder 20 so that movement of the slide piece to the lower side direction (to the outer side in the radial direction of the key rotor 22) is stopped (not allowed). The lower side surface of the slide piece 28 is curved along the inner peripheral surface of the ignition cylinder 20, and the slide piece 28 is rotatable integrally with the key rotor 22. Further, the lower side surface of the slide piece 28 is opened toward the lower side via the outer peripheral portion of the ignition cylinder 20.

The upper portion (the inner side portion in the radial direction of the key rotor 22) of the slide piece 28 forms the outer peripheral surface of the insertion hole 24 of the key rotor 22. In the state in which the ignition key 26 is inserted in the insertion hole 24, the ignition key 26 regulates movement of the slide piece 28 to the upper side (to the inner side in the radial direction of the key rotor 22). To the contrary, in the state in which the ignition key 26 is pulled out from the insertion hole 24, movement of the slide piece 28 to the upper side is allowed.

An elongated plate-shaped lock plate 30 is supported by the lower portion of the ignition cylinder 20 at the intermediate portion in the longitudinal (front and rear) direction in such a manner as to be rotatable and movable in the vertical (upper and lower) direction. The lock plate 30 is urged in a direction to which it moves upper side, and further, is urged such that the front end of the lock plate rotates to the upper side and the rear end thereof rotates to the lower side. A front side portion and a rear side portion of the lock plate 30 are each formed substantially into an L-shaped plate, and a front end and a rear end of the lock plate 30 are each made to protrude to the upper side.

The front end of the lock plate 30 passes through (penetrates) the outer peripheral portion of the ignition cylinder 20 and is made to abut against the lower side surface of the slide piece 28. When the ignition key 26 is inserted in the insertion hole 24, movement of the slide piece 28 to the upper side is regulated, whereby rotation of the lock plate 30 by means of the urging force is regulated. To the contrary, when the ignition key 26 is pulled out from the insertion hole 24, movement of the slide piece 28 to the upper side is allowed, whereby the front end of the lock plate 30 moves the slide piece 28 to the upper side by means of the urging force, the front end of the lock plate 30 is rotated to the upper side, and the rear end of the lock plate 30 is rotated to the lower side. Moreover, when the key rotor 22 is arranged at the "ACC" position, "ON" position or "START" position, the front end of the lock plate 30 is made to abut against the outer peripheral surface of the key rotor 22, whereby rotation of the lock plate 30 by means of the urging force is regulated.

A cam shaft 32 that serves as a rotating member is rotatably accommodated within the accommodating cylinder 16 at the rear side of the ignition cylinder 20. A substantially cylinder shaped outer cylinder 34 is provided at the side of the outer periphery of the cam shaft 32 and a substantially cylinder shaped inner cylinder 36 is provided at the side of the inner periphery of the cam shaft 32. The outer cylinder 34 and the inner cylinder 36 are integrated with each other at their respective front ends. Further, the inner cylinder 36 passes through (penetrates) the rear wall 16A of the accommodating cylinder 16 and protrudes to the rear side of the accommodating cylinder 16.

The rear end of the key rotor 22 is fitted into the inner cylinder 36, and the cam shaft 32 is rotatable so as to be integrated with the key rotor 22.

A return spring 38 that serves as a rotation urging member is accommodated within the outer cylinder 34 on the outer periphery of the inner cylinder 36, and one end (the front side end) of the return spring 38 is connected (latched) to the outer cylinder 34. When the cam shaft 32 is moved to be arranged from the "ON" position to the "START" position, the other end (the rear side end) of the return spring 38 is connected within the accommodating cylinder 16, and the cam shaft 32 is urged in a direction from the "START" position to the "ON" position.

An inclined surface (not shown in the drawings) is formed in the lower side portion of the outer cylinder 34, and the inclined surface is made to slope to a direction which is from the "START" position of the key rotor 22 to the "LOCK" position via the "ON" position and the "ACC" position in accordance from the rear side to the front side. A regulating surface 40 (see FIGS. 7 and 8) is formed on the upper side portion of the outer cylinder 34, and the regulating surface 40 is disposed perpendicular to the circumferential direction of the outer cylinder 34.

An ignition switch 42 is fixed at the rear side of the accommodating cylinder 16, and the inner cylinder 36 rear end of the cam shaft 32 is inserted in the ignition switch 42. As a result, due to the cam shaft 32 being connected to the ignition switch 42 and the cam shaft 32 being rotated integrally with the key rotor 22, the ignition switch 42 can be operated.

A substantially rectangular pillar shaped slider 44 that serves as a connecting member is accommodated in the accommodating cylinder 16 at the lower side of the cam shaft 32, and the slider 44 is movable (slidable) in the longitudinal (front and rear) direction integrally with a lock bar 54, as described below.

A moving protrusion 46 having a pillar shape is formed in a rear portion of the slider 44, and the moving protrusion 46 protrudes to the upper side from the slider 44. An inclined surface of the cam shaft 32 (outer cylinder 34) comes into contact with the moving protrusion 46 by means of the urging force of a compression spring 58 described later, by this, the slider 44 abuts against the rear wall 16A of the accommodating cylinder 16 such that movement to the rear side is stopped (not allowed), and rotation of the cam shaft 32 is inhibited and the key rotor 22 is, as described above, arranged at the "LOCK" position.

A plate-shaped engagement hole 48 is formed in the front side portion of the slider 44 at the central part in the horizontal (left and right) direction. The engagement hole 48 is opened at the front side, upper side and lower side of the slider 44. A substantially trapezoidal plate-shaped engagement protrusion 50 is formed at the front end and upper end of the slider 44 and the engagement protrusion 50 is disposed within the engagement hole 48. A rectangular pillar shaped fitting protrusion 52 is formed at the rear end of the slider 44 and the fitting protrusion 52 is made to protrude to the lower side from the slider 44.

A substantially rectangular pillar shaped lock bar 54 that serves as a lock member is accommodated within the lock cylinder 18. The lock bar 54 is guided by the lock cylinder 18 and is movable (slidable) in the longitudinal (front and rear) direction.

A fitting concave portion 56 having a rectangular pillar shape is formed at the upper end of the front portion of the lock bar 54. The fitting concave portion 56 is opened at the upper side from the lock bar 54. The fitting protrusion 52 of the slider 44 is fitted into the fitting concave portion 56, and the lock bar 54 can be moved in the longitudinal (front and rear) direction in such a manner as to be integrated with the slider 44.

A compression spring 58 that serves as lock urging member is bridged between the front end of the lock cylinder 18 and the front end of the lock bar 54. The compression spring 58 urges the lock bar 54 and the slider 44 to the rear side. As a result, due to the urging force of the compression spring 58, the slider 44 is made to abut against the rear wall 16A of the accommodating cylinder 16, and movement of the slider 44 and the lock bar 54 to the rear side is stopped (not allowed).

The lock bar 54 protrudes to the rear side from the lock cylinder 18 and also protrudes to the rear side from the fixed piece 14. The lock bar 54 is made to pass through (penetrates) the above-described steering post and is engaged with the steering shaft (not shown in the drawings) within the steering post. As a result, rotation of the steering shaft is locked and rotation of a steering wheel (not shown in the drawings) which is fixed at the upper end of the steering shaft is locked.

Figure 5:
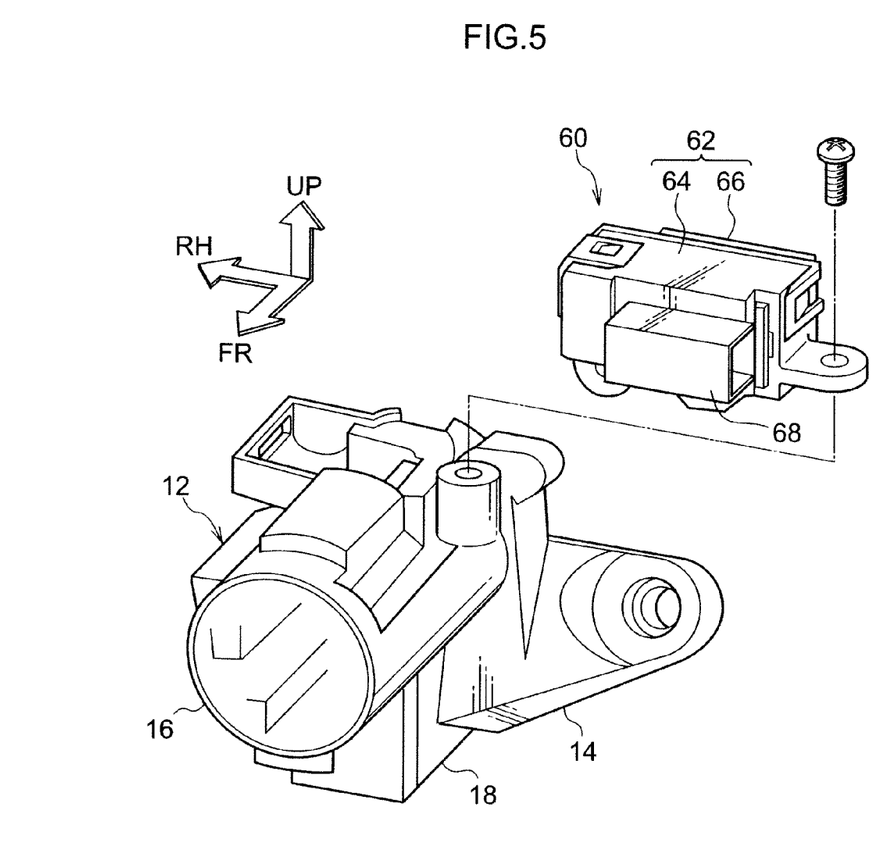
FIG. 5 is an exploded perspective view showing a lock body and an interlock unit in the steering lock device according to the first exemplary embodiment of the present invention, when seen obliquely from the front of the left side.

As is also shown in FIG. 5, an interlock unit 60 is mounted at the upper end of the accommodating cylinder 16 at the rear portion of the accommodating cylinder.

Figure 3:
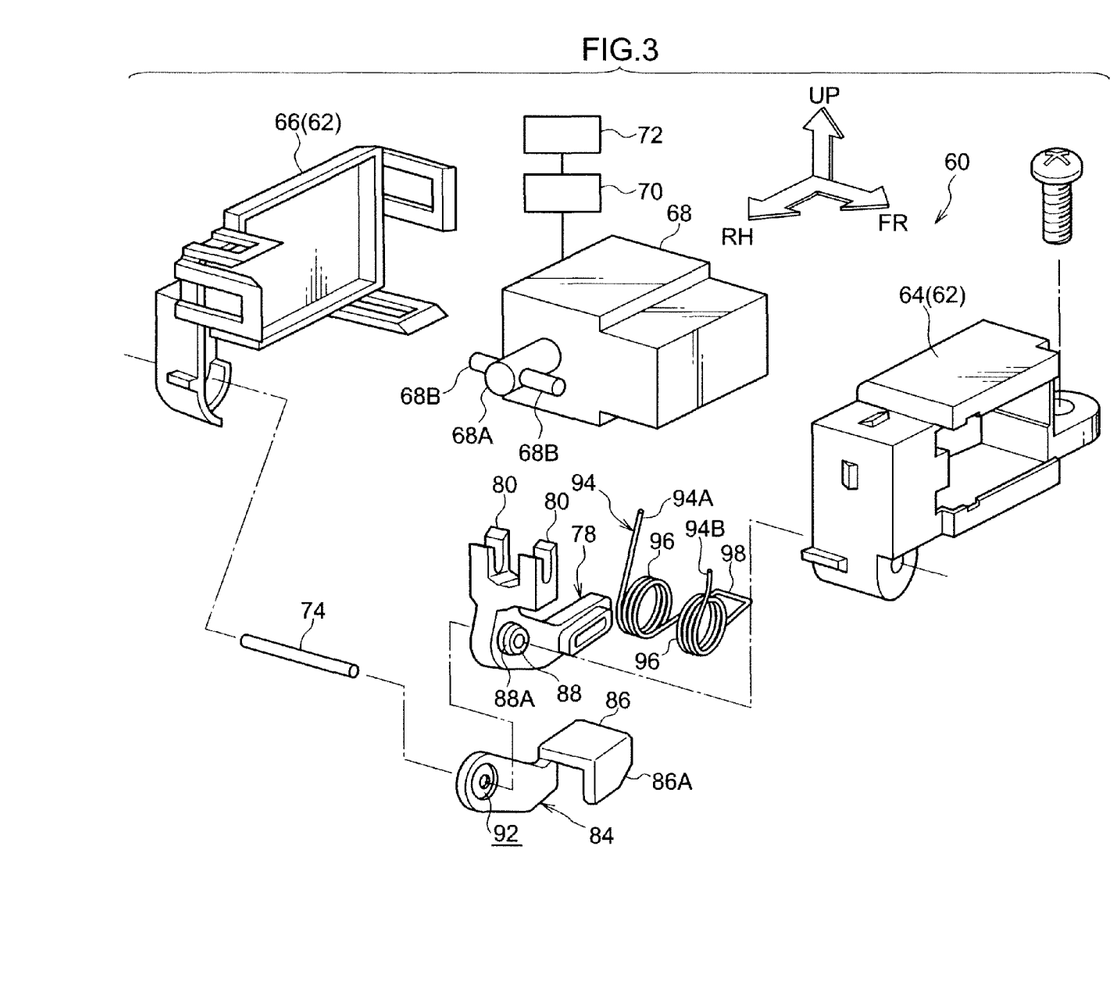
FIG. 3 is an exploded perspective view showing an interlock unit in the steering lock device according to the first exemplary embodiment of the present invention, when seen obliquely form the front of right side.

As shown in FIG. 3, a substantially rectangular parallel-epiped box-shaped unit box 62 that is a subject to be assembled is provided at the outer periphery of the interlock unit 60. The unit box 62 is formed by a combination of a front side case 64 and a rear side cover 66. A lower wall of the unit box 62 is partially opened and the interior of the unit box 62 communicates with the interior of the accommodating cylinder 16.

A solenoid 68 that serves as a driving section is accommodated within the unit box 62. The solenoid 68 includes a circular cylinder (column) shaped plunger 68A serving as a driving member, and the tip end of the plunger 68A is protrude from the solenoid 68 to the right side. An engagement shaft 68B in the form of a circular shaft passes through (penetrates) the end of the plunger 68A, and the engagement shaft 68B protrudes from the plunger 68A in the longitudinal (front and rear) direction.

The solenoid 68 is connected to a shift lever device 72 of the vehicle via a vehicle control device 70. When a shift lever (not shown in the drawings) of the shift lever device 72 is operated to move to a shift position (an allowable shift position such as an "R" shift position, an "N" shift position, a "D" shift position or the like) other than the "P" shift position (a regulated shift position), the solenoid 68 is driven by control of the control device 70, to regulate movement of the plunger 68A to the right side, whereby an increase in the amount of the plunger 68A protruding from the solenoid 68 is regulated (see FIG. 7). To the contrary, when the shift lever of the shift lever device 72 is operated to move to the "P" shift position, the solenoid 68 is not driven, and movement of the plunger 68A to the right side is allowed, whereby an increase in the amount of the plunger 68A protruding from the solenoid 68 is allowed (see FIG. 8).

In the unit box 62, a circular shaft 74 (a support shaft) is supported at the right side and the lower side of the solenoid 68, and the shaft 74 is bridged between the case 64 and the cover 66 of the unit box 62 and extends in the longitudinal direction (front and rear direction).

Figure 4:
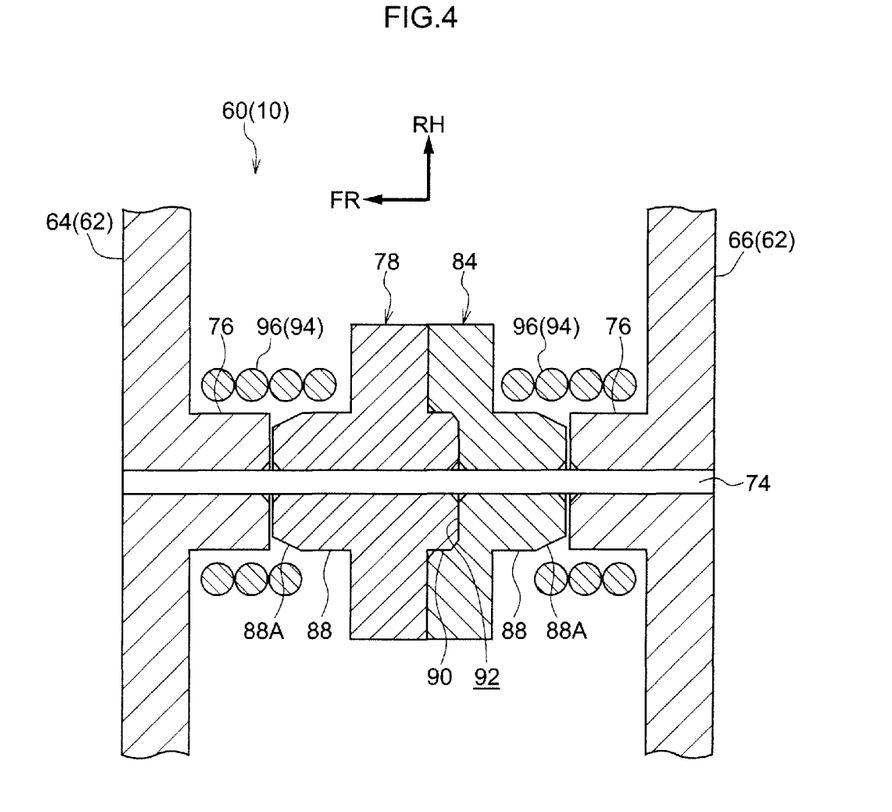
FIG. 4 is a cross sectional view showing a principal portion including the link, the release link and the torsion link in the steering lock device according to the first exemplary embodiment, when seen from the top.

As shown in FIG. 4, circular shaft-shaped holding shafts 76 serving as a protruding portion are formed integrally with the case 64 and the cover 66, respectively, at shaft 74 supporting portions, and the holding shafts 76 protrude into the unit box 62. The shaft 74 passes through (penetrates) and is fitted to the holding shaft 76 at the central shaft position of the holding shaft, and the unit box 62 supports the shaft 74 between a pair of holding shafts 76.

As shown in FIG. 3, a longitudinal-direction intermediate portion of a link 78 having an substantially L-shaped cross sectional configuration and serving as a regulating member is supported by the shaft 74 in a rotatable manner, and a pair of U-shaped engagement frames 80 are formed integrally at the upper side end of the link 78. The pair of engagement frames 80 face each other in the longitudinal direction (front and rear direction). The tip end of the plunger 68A of the solenoid 68 is inserted between the pair of engagement frames 80, and the engagement shaft 68B of the plunger 68A tip end is inserted in the pair of engagement frames 80. As a result, the upper side end of the link 78 is engaged with the tip end of the plunger 68A in rotatable and movable manner.

A hook portion 82 having a U-shaped cross sectional configuration is formed integrally with the upper side end of the link 78 at the front and left sides of the link, and the interior of the hook portion 82 is opened to the left side.

An upper side end of a substantially plate-shaped release link 84 that serves as an allowing member is supported by the shaft 74 in a rotatable manner, and the release link 84 is disposed at the rear side of the link 78. A release plate 86 having a plate like L-shaped cross section is formed integrally with the lower side end of the release link 84. The release plate 86 is disposed in the upper and front sides of the lower side end of the link 78. A release surface 86A is formed on the front side plate of the release plate 86 in a portion of the left and lower sides. The release surface 86A is formed so as to be inclined toward the upper side as directed toward left side, and is disposed at the left side of the lower side end surface 78A of the link 78.

As shown in FIG. 4, substantially circular shaft-shaped spring holding shafts 88 that serve as a holding portion are formed in portions supported by the shaft 74 so as to be provided integrally with the link 78 and the release link 84 respectively. The shaft 74 passes through (penetrates) and is fitted in the spring holding shafts 88 at the central shaft portions thereof. The spring holding shaft 88 of the link 78 protrudes from the link 78 to the front side (which side is opposite to that in which the release link 84 is disposed), and is made to face the holding shaft 76 of the case 64. The spring holding shaft 88 of the release link 84 protrudes from the release link 84 to the rear side (which side is opposite to that in which the link 78 is disposed) and is made to face the holding shaft 76 of the cover 66.

A tapered surface 88A that serves as guiding portion is formed at the protruding tip end portion of the spring holding shaft 88, and the spring holding shaft 88 is formed such that, at the tapered surface 88A position, the diametrical dimension gradually becomes smaller toward the protruding tip end side.

A substantially circular cylinder (column) shaped fitting convex portion 90 that forms a fitting portion is formed integrally with the rear side surface of the link 78 in a portion supported by the shaft 74, and the shaft 74 is made to pass through (penetrate) and fitted in the fitting convex portion 90 in the central shaft portion thereof.

A substantially circular cylinder (column) fitting concave portion 92 that forms the fitting portion is formed integrally with the front side surface of the release link 84 in a portion supported by the shaft 74, and the shaft 74 is made to pass through the fitting concave portion 92 in the central shaft portion thereof. The fitting convex portion 90 is fitted in the fitting concave portion 92 in a rotatable manner, whereby the link 78 and the release link 84 are positioned (aligned) in such a state as to be relatively rotatable.

As shown in FIGS. 1 through 4, a torsion spring 94 that serves as an urging member is held in the unit box 62, the link 78 and the release link 84.

Spiral portions 96 having spiral configuration each serving as a holding member are formed at the front side portion and rear side portion of the torsion spring 94, respectively. The holding shaft 76 of the case 64 and the spring holding shaft 88 of the link 78 are made to pass through (penetrate) the front side spiral portion 96 so as to be in a non-removable manner. The holding shaft 76 of the cover 66 and the spring holding shaft 88 of the release link 84 are made to pass through (penetrate) the rear side spiral portion 96 so as to be in a non-removable manner.

A U-shaped connecting portion 98 is formed at the intermediate portion of the torsion spring 94 in the longitudinal direction (front and rear direction). The connecting portion 98 connects the pair of spiral portions 96 with each other. As a result, the torsion spring 94 limits being away of the link 78 and the release link 84 in the longitudinal direction (front and rear direction), to restrict cancellation of a state in which the fitting convex portion 90 of the link 78 and the fitting concave portion 92 of the release link 84 are fitted each other. Further, the intermediate portion of the connecting portion 98 is disposed at the upper side of the lower side end of the link 78 and the lower side end of the release link 84.

The rear side end 94A of the torsion spring 94 protrudes to the upper side from the rear side spiral portion 96 and is caught by the cover 66. As a result, the torsion spring 94 urges, at the intermediate portion of the connecting portion 98, the lower side end of the release link 84 to the lower side. The front side end 94B of the torsion spring 94 protrudes to the upper side upward from the front side spiral portion 96 and is caught in a hook portion 82 of the link 78. As a result, the link 78 is urged in a direction in which the lower side end thereof is rotated to the upper side, and the lower side end of the link 78 is made to abut against the upper side plate of the release plate 86 of the release link 84, whereby the link 78 and the release link 84 are integrally rotatable.

The lower side end of the link 78 and the lower side end (the release plate 86) of the release link 84 are made to protrude to the lower side from the open portion on the lower wall of the unit box 62, and are inserted in the accommodating cylinder 16 of the lock body 12. The release plate 86 of the release link 84 abuts against the outer peripheral surface of the cam shaft 32 (the outer cylinder 34) by means of urging force of the torsion spring 94 (the rear side spiral portion 96).

Figure 7:
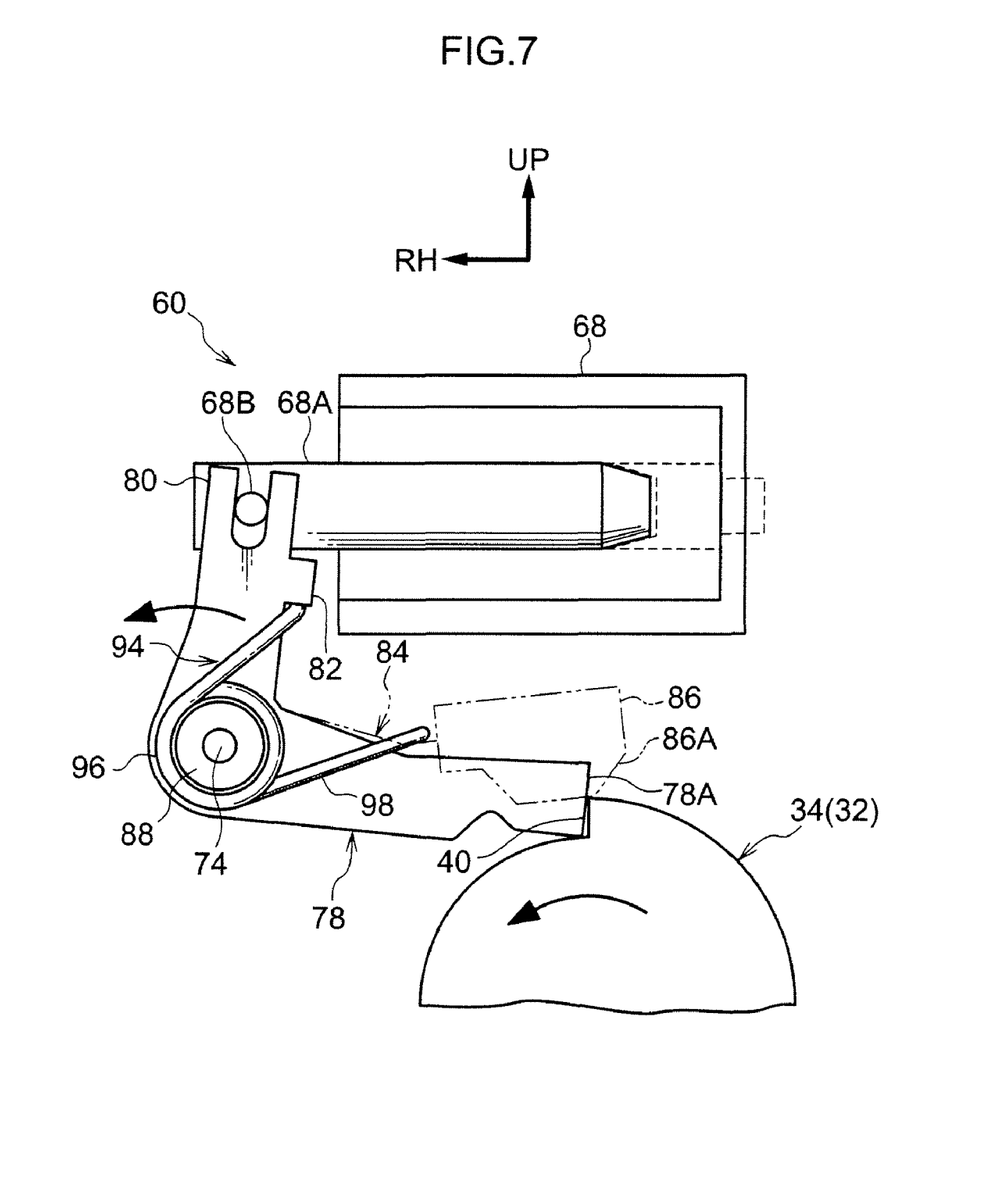
FIG. 7 is a cross sectional view showing an operation of an interlock unit when a shift lever is operated to move to a shift position other than a "P" shift position in the steering lock device according to the first exemplary embodiment of the present invention, when seen from the front side.
Figure 8:
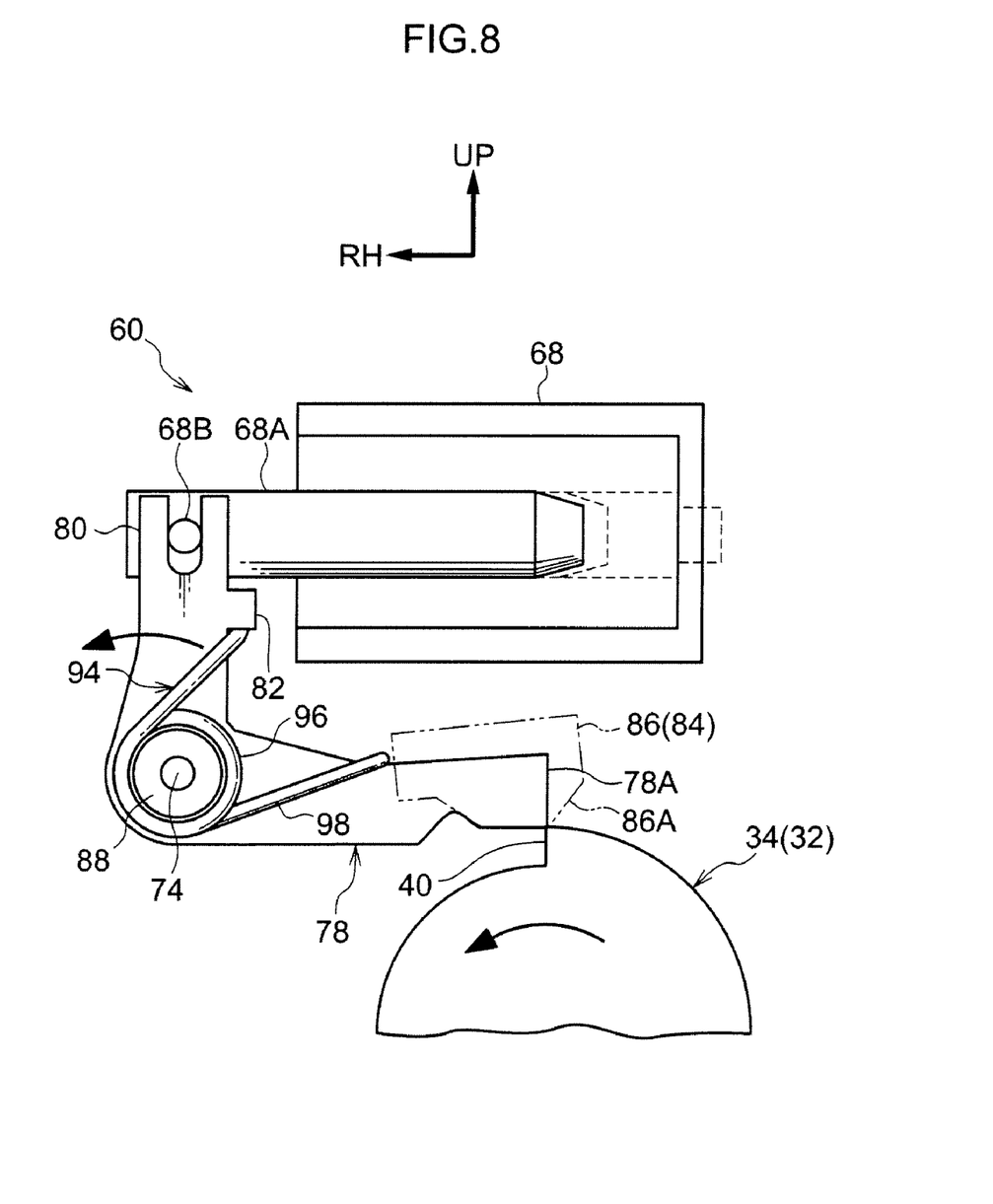
FIG. 8 is a cross sectional view showing an operation of an interlock unit when a shift lever is operated to move to the "P" shift position in the steering lock device according to the first exemplary embodiment of the present invention, when seen from the front side.

As shown in FIG. 7 and FIG. 8, when the key rotor 22 and the cam shaft 32 are rotated from the "ACC" position to the "LOCK" position, the regulating surface 40 of the cam shaft 32 (the outer cylinder 34) is made to abut against the release surface 86A of the release link 84, and the lower side end of the release link 84 is moved to the upper side.

As shown in FIG. 7, when the shift lever is operated to move to a shift position other than the "P" shift position and an increase in the amount of the plunger 68A protruding from the solenoid 68 is regulated, rotation of the link 78 is regulated, and movement of the lower side end of the link 78 to the upper side (to the outer side in the radial direction of the accommodating cylinder 16) is regulated. To the contrary, as shown in FIG. 8, when the shift lever is operated to move to the "P" shift position and the increase in the amount of the plunger 68A protruding from the solenoid 68 is allowed, rotation of the link 78 is allowed and movement of the lower side end of the link 78 to the upper side is allowed.

Next, the operation of the exemplary embodiment is described.

In the steering lock device 10 having the above-described structure, the key rotor 22 and the cam shaft 32 are arranged at the "LOCK" position, and the lock bar 54 is made to protrude from the fixed piece 14 of the lock body 12 to the rear side to engage with the steering shaft, whereby rotation of the steering shaft and the steering wheel is locked.

Further, by the ignition key 26 being inserted in the insertion hole 24 of the key rotor 22 and operated to rotate, the key rotor 22 and the cam shaft 32 are rotated to the "ACC" position, "ON" position and "START" position, so that the ignition switch 42 is operated.

When the key rotor 22 and the cam shaft 32 are rotated from the "LOCK" position to the "ACC" position, the inclined surface of the cam shaft 32 (the outer cylinder 34) is rotated so that the moving protrusion 46 of the slider 44 is pressed to the front side, whereby the slider 44 and the lock bar 54 are moved to the front side against the urging force of the compression spring 58. For this reason, when the key rotor 22 and the cam shaft 32 are rotated to the "ACC" position, protruding of the lock bar 54 from the fixed piece 14 of the lock body 12 is cancelled, and engagement of the lock bar 54 to the steering shaft is cancelled. As a result, rotation of the steering shaft and the steering wheel is allowed.

Further, when the key rotor 22 and the cam shaft 32 are rotated from the "LOCK" position to the "ACC" position, the slider 44 is moved to the front side as described above, whereby the rear end of the lock plate 30 is temporarily moved to the lower side against the urging force and the engagement protrusion 50 of the slider 44 overstrides the rear end of the lock plate 30. As a result, the engagement protrusion 50 of the slider 44 is engaged with the rear end of the lock plate 30, so movement of the slider 44 and the lock bar 54 to the rear side by means of the urging force of the compression spring 58 is stopped.

In addition, when the key rotor 22 and the cam shaft 32 are moved from the "ACC" position and arranged at the "START" position via the "ON" position, the front end of the lock plate 30 abuts against the peripheral surface of the key rotor 22, whereby rotation of the rear end of the lock plate 30 to the lower side is regulated and the state in which the engagement protrusion 50 of the slider 44 is engaged with the rear end of the lock plate 30 is maintained. Further, when the key rotor 22 and the cam shaft 32 are rotated from the "ACC" position to the "LOCK" position, the ignition key 26 regulates movement of the slide piece 28 toward the inner side in the radial direction of the key rotor 22, and due to the front end of the lock plate 30 abutting against the slide piece 28, rotation of the rear end of the lock plate 30 to the lower side is regulated and the state in which the engagement protrusion 50 of the slider 44 is engaged with the rear end of the lock plate 30 is maintained.

Consequently, the state in which movement of the slider 44 and the lock bar 54 to the rear side by means of the urging force of the compression spring 58 is stopped (not allowed) is maintained, and the state of cancel of the lock bar 54 protruding from the fixed piece 14 of the lock body 12 is maintained. For this reason, permission of rotation of the steering shaft and the steering wheel is maintained.

When the key rotor 22 and the cam shaft 32 are arranged at the "LOCK" position and the ignition key 26 is pulled out from the insertion hole 24 of the key rotor 22, movement of the slide piece 28 toward the inner side in the radial direction of the key rotor 22 is allowed, so that the slide piece 28 is moved toward the inner side in the radial direction of the key rotor 22 and the front end of the lock plate 30 is rotated upward by means of the urging force. As a result, the rear end of the lock plate 30 is rotated to the lower side and engagement of the engagement protrusion 50 of the slider 44 with the rear end of the lock plate 30 is cancelled. Thus, the slider 44 and the lock bar 54 are moved to the rear side by means of the urging force of the compression spring 50 and the lock bar 54 is made to protrude from the fixed piece 14 of the lock body 12 to the rear side. For this reason, the lock bar 54 is engaged with the steering shaft, and rotation of the steering shaft and steering wheel is locked.

Moreover, as shown in FIG. 7 and FIG. 8, in the interlock unit 60, when the key rotor 22 and the cam shaft 32 is rotated from the "ACC" position to the "LOCK" position, the regulating surface 40 of the cam shaft 32 (the outer cylinder 34) abuts against the release surface 86A of the release link 84 (the release plate 86), and the lower side end (the release plate 86) of the release link 84 is moved to the upper side against the urging force of the torsion spring 94 (the rear side spiral portion 96).

As shown in FIG. 7, when the shift lever of the shift lever device 72 is operated to be located at a shift position other than the "P" shift position, the solenoid 68 is driven and the increase in the amount of the plunger 68A protruding from the solenoid 68 is regulated. For this reason, rotation of the link 78 is regulated and movement of the lower side end of the link 78 to the upper side is regulated.

Consequently, when the key rotor 22 and the cam shaft 32 are rotated from the "ACC" position to the "LOCK" position and the lower side end (the release plate 86) of the release link 84 is moved to the upper side, the link 78 is not rotated integrally with the release link 84 and the lower side end of the link 78 does not move to the upper side, whereby the lower side end surface 78A of the link 78 is engaged with (abuts against) the regulating surface 40 of the cam shaft 32 (the outer cylinder 32). For this reason, rotation of the key rotor 22 and the cam shaft 32 from the "ACC" position to the "LOCK" position is regulated by the link 78, and pull-out of the ignition key 26 from the insertion hole 24 of the key rotor 22 is regulated (locked).

As shown in FIG. 8, when the shift lever is operated to be located at the "P" shift position, the solenoid 68 is not driven and the increase in the amount of the plunger 68A protruding from the solenoid 68 is allowed. Accordingly, rotation of the link 78 is allowed and movement of the lower side end of the link 78 to the upper side is allowed.

As a result, when the key rotor 22 and the cam shaft 32 are rotated from the "ACC" position to the "LOCK" position and the lower side end (the release plate 86) of the release link 84 is moved to the upper side, the link 78 is rotated integrally with the release link 84 and the lower side end of the link 78 is moved to the upper side, whereby the lower side end surface 78A of the link 78 is not engaged with (does not abut against) the regulating surface 40 of the cam shaft 32 (the outer cylinder 34). For this reason, rotation of the key rotor 22 and the cam shaft 32 from the "ACC" position to the "LOCK" position is allowed, and pull-out of the ignition key 26 from the insertion hole 24 of the key rotor 22 is allowed.

Figure 1:
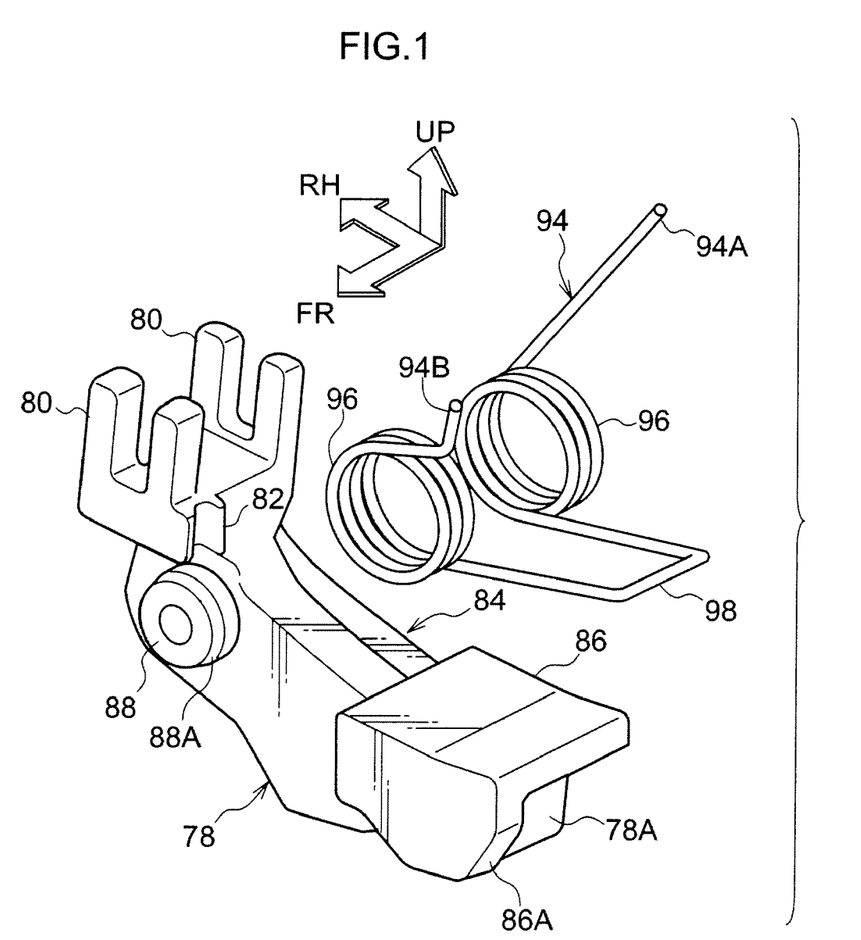
FIG. 1 is an exploded perspective view showing a link, a release link and a torsion link in a steering lock device according to a first exemplary embodiment of the present invention, when seen obliquely from the front of the left side.
Figure 2:
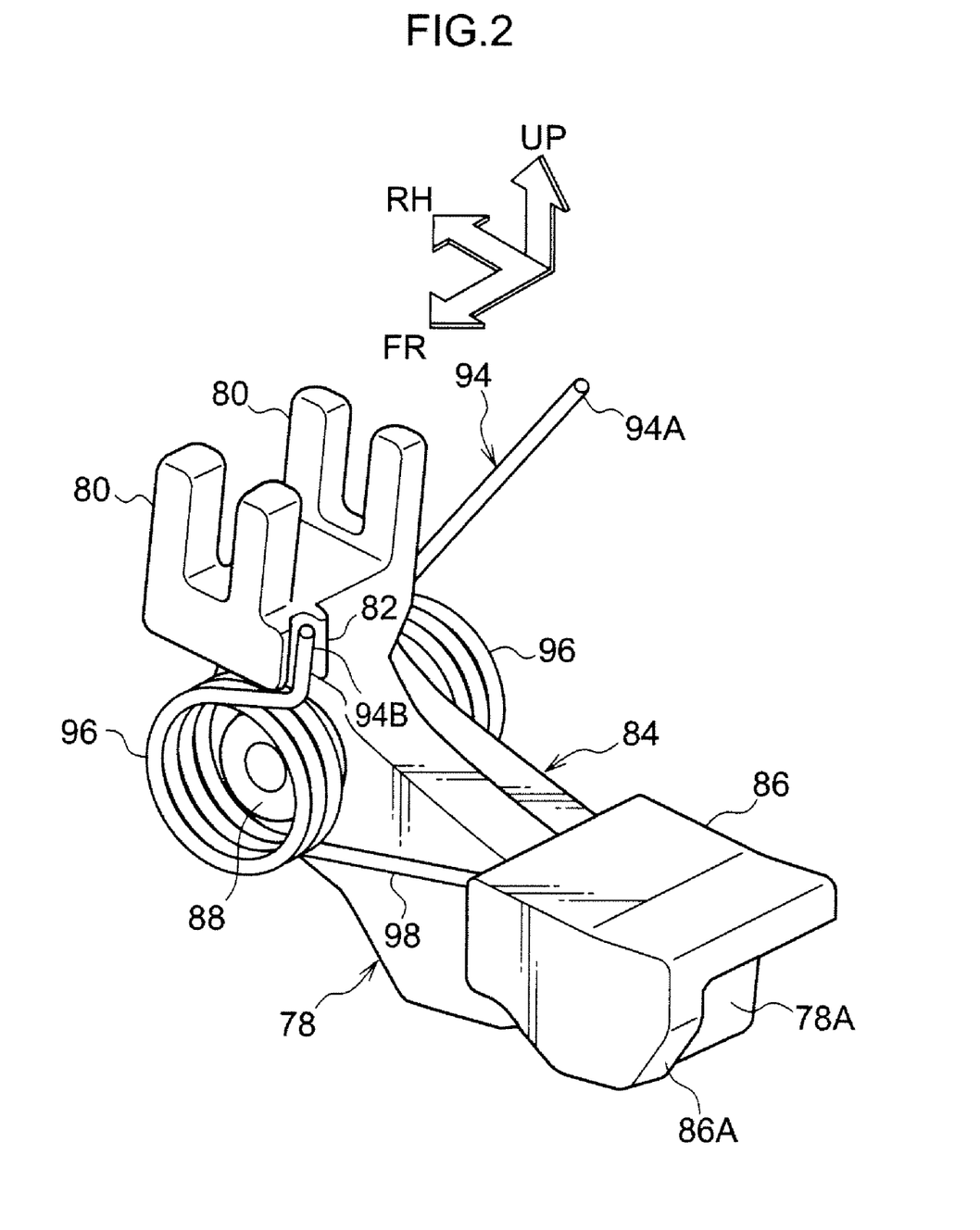
FIG. 2 is a perspective view showing a state in which the link, the release link and the torsion link in the steering lock device according to the first exemplary embodiment of the present invention are temporarily assembled and mounted, when seen obliquely from the front of the left side.

Incidentally, when assembling of the interlock unit 60 is carried out, as shown in FIG. 1 and FIG. 2, in the state in which the fitting convex portion 90 of the link 78 is fitted in the fitting concave portion 92 of the release link 84, the torsion spring 94 (particularly, the connecting portion 98) is temporarily elastically deformed, and the pair of spiral portions 96 of the torsion spring 94 are mounted to the respective spring holding shafts 88 of the link 78 and the release link 84, respectively. As a result, the link 78 and the release link 84 are held by the torsion spring 94, and the link 78, the release link 84 and the torsion spring 94 are brought into a temporarily assembled state, and the front side end 94B of the torsion spring 94 is caught in the hook portion 82 of the link 78.

Next, the shaft 74 is made to pass through (penetrate) the spring holding shafts 88 of the link 78 and the release link 84. Further, the tip end of the plunger 68A of the solenoid 68 is inserted between the pair of engagement frames 80 of the link 78, and the engagement shaft 68B (68B and 68B in FIG. 3) at the tip end of the plunger 68A is inserted in each of the pair of engagement frames 80, so as to mount the link 78 to the solenoid 68. Moreover, the solenoid 68 is mounted (fitted) within the case 64.

Subsequently, the case 64 and the cover 66 are assembled to form the unit box 62. In this case, the shaft 74 is made to pass through the holding shaft 76 of the case 64 and the cover 66 and the pair of spiral portions 96 of the torsion spring 94 are mounted to the holding shafts 76 of the case 64 and the cover 66, respectively. Further, the rear side end 94A of the torsion spring 94 is hooked on the cover 66.

Here, as described above, with the pair of spiral portions 96 of the torsion spring 94 being respectively mounted on the spring holding shafts 88 of the link 78 and the release link 84, the link 78, the release link 84 and the torsion spring 94 are brought into a temporarily assembled state. For this reason, the link 78, the release link 84 and the torsion spring 94 are easily assembled to the unit box 62 (the case 64 and the cover 66), and assembling of the interlock unit 60 can be easily performed.

Moreover, when the pair of spiral portions 96 of the torsion spring 94 are respectively mounted to the spring holding shafts 88 of the link 78 and the release link 84, the pair of spiral portions 96 are guided by (made into slide-contact with) the tapered surfaces 88A of the respective spring holding shafts 88, and are separated from each other. For this reason, the pair of spiral portions 96 of the torsion spring 94 can be easily mounted on the spring holding shafts 88 of the link 78 and the release link 84, respectively, and the link 78, the release link 84 and the torsion spring 94 can be easily brought into a temporarily assembled state.

In addition, when the link 78, the release link 84 and the torsion spring 94 are brought into a temporarily assembled state, the fitting convex portion 90 of the link 78 is fitted in the fitting concave portion 92 of the release link 84. For this reason, it is possible to effectively suppress the temporarily assembled state of the link 78 and the release link 84 from being cancelled, and it is also possible to effectively suppress the temporarily assembled state of the link 78, the release link 84 and the torsion spring 94 from being cancelled.

Further, when the case 64 and the cover 66 are assembled and mounted, not only the pair of spiral portions 96 of the torsion spring 94 are mounted on the spring holding shafts 88 of the link 78 and the release link 84, respectively, but also are mounted to the holding shafts 76 of the case 64 and the cover 66. For this reason, it is possible to prevent the pair of spiral portions 96 from being respectively removed from the spring holding shafts 88 of the link 78 and the released link 84, and cancellation of the state in which the torsion spring 94 is assembled and mounted to the link 78 and the release link 84 can be prevented.

As described above, when the case 64 and the cover 66 are assembled, it is possible to prevent the pair of spiral portions 96 of the torsion spring 94 from being removed from the spring holding shafts 88 of the link 78 and the released link 84. Thus, it is not necessary to increase the amount of the spring holding shafts 88 protruding from the link 78 and the release link 84, respectively. Accordingly, when the pair of spiral portions 96 are mounted to the spring holding shafts 88 of the link 78 and the release link 84, respectively, plastic deformation of the torsion spring 94 (particularly, the connecting portion 98) can be prevented.

In the first exemplary embodiment as described above, although the fitting convex portion 90 is provided in the link 78 and the fitting concave portion 92 is provided in the release link 84, another structure in which the fitting concave portion 92 is provided in the link 78 and the fitting convex portion 90 is provided in the release link 84 is possible.

Second Embodiment

Figure 9:
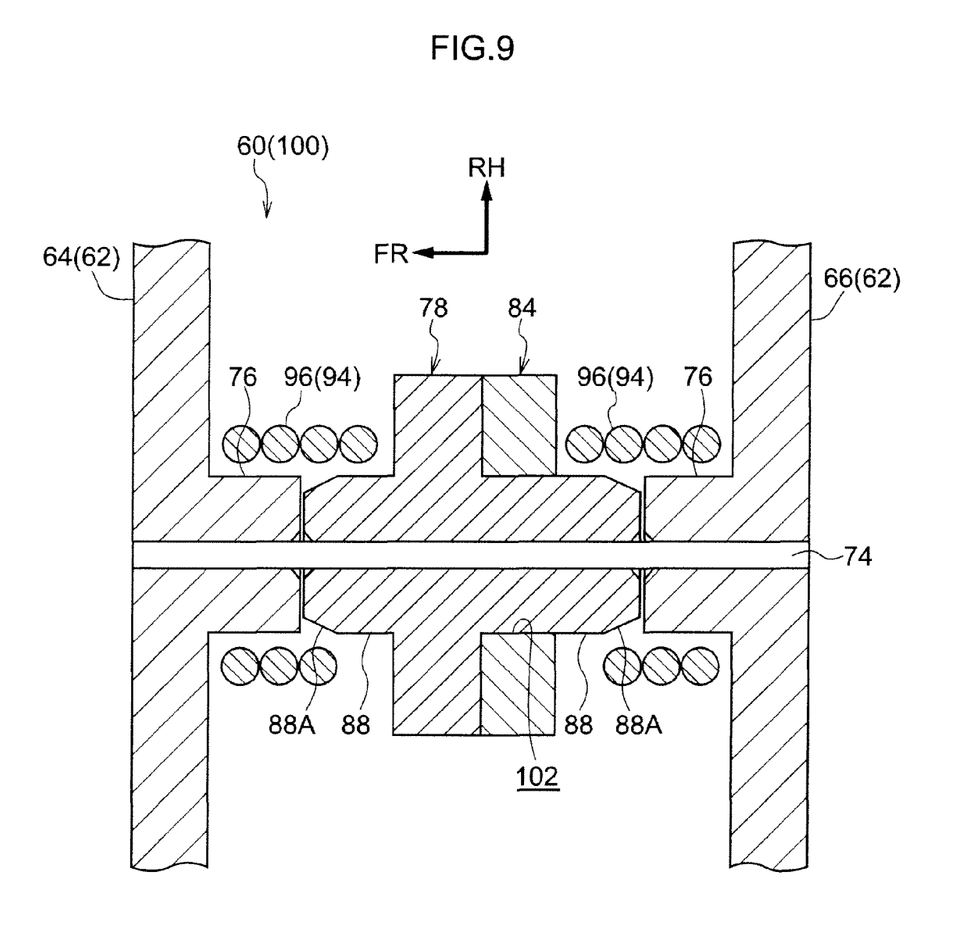
FIG. 9 is a cross sectional view showing a principal portion including a link, a release link and a torsion spring in a steering lock device according to a second exemplary embodiment of the present invention, when seen from the top.

FIG. 9 shows a cross sectional view of a principal section of a steering lock device 100 that serves as a key device according to a second exemplary embodiment of the present invention when seen from the top.

The steering lock device 100 according to the second exemplary embodiment has substantially the same structure as that of the first embodiment except the following points.

As shown in FIG. 9, in the steering lock device 100 according to the second exemplary embodiment, the fitting convex portion 90 is not formed in the link 78, and the fitting concave portion 92 is not formed in the release link 84.

The spring holding shaft 88 is not formed integrally with the rear side surface of the release link 84, but is formed integrally with the rear side surface of the link 78, so as to provide the structure of the fitting section.

A substantially circular fitting hole 102 that forms (serves as) the fitting portion is formed in penetration manner in the release link 84 in a portion through which the shaft 74 passes, and the shaft 74 is made to pass through (penetrate) the fitting hole 102 in the central shaft portion. The spring holding shaft 88 at the rear side surface of the link 78 is made to pass through (penetrate) and fit with the fitting hole 102 in a rotatable manner. As a result, the link 78 and the release link 84 are positioned (aligned) in such a state as to be relatively rotatable.

Here, when the link 78, the release link 84 and the torsion spring 94 are brought into a temporarily assembled state, in the state in which the spring holding shaft 88 at the rear side surface of the link 78 is made to pass through (penetrate) and fit with the fitting hole 102 of the release link 84, the torsion spring 94 (particularly, the connecting portion 98) is temporarily elastically deformed, and the pair of spiral portions 96 of the torsion spring 94 are mounted to the pair of spring holding shafts 88 (that is, the spring holding shafts 88 at the rear side surface and at the front side surface) of the link 78 respectively. As a result, the link 78 and the release link 84 are held by the torsion spring 94.

Consequently, in the second exemplary embodiment as well, the same operation and effect as those of the first exemplary embodiment can be achieved.

Furthermore, when the link 78, the release link 84 and the torsion spring 94 are brought into a temporarily assembled state, the spring holding shaft 88 at the rear side surface of the link 78 is made to pass through (penetrate) and is fit into the fitting hole 102 of the release link 84. For this reason, cancellation of the state in which the link 78 and the release link 84 are assembled can be more effectively suppressed, and cancellation of the state in which the link 78, the release link 84 and the torsion spring 94 are temporarily assembled can be more effectively suppressed.

Furthermore, the shaft 74 is made to pass through (penetrate) and is fit into the pair of spring holding shafts 88 of the link 78. For this reason, inclining movement of the link 78 in the longitudinal direction (front and rear direction) can be effectively suppressed, and the lower side end surface 78A of the link 78 can be more properly engaged with (abut against) the regulating surface 40 of the cam shaft 32 (the outer cylinder 34), and further, rotation of the key rotor 22 and the cam shaft 32 from the "ACC" position to the "LOCK" position can be more properly regulated by the link 78.

In the second exemplary embodiment, the structure in which the pair of spring holding shafts 88 are provided in the link 78 and the fitting hole 102 is provided in the release link 84 is explained. Alternatively, a structure in which the fitting hole 102 is provided in the link 78 and the pair of spring holding shafts 88 are provided in the release link 84 is also possible.

Further, in the first and second exemplary embodiments as described above, the structure in which the tapered surfaces 88A that serve as guiding portion are provided at the tip ends of the spring holding shafts 88 are provided is shown. However, a structure in which an elastic portion serving as guiding portion is provided at at least a part of the spring holding shaft 88 (particularly, at a portion with which the spiral portion 96 firstly comes into sliding-contact when the spiral portion 96 of the torsion spring 94 is mounted to the spring holding shaft 88) is also possible. In this case, particularly, when the spiral portion 96 of the torsion spring 94 is mounted to the spring holding shaft 88, the spiral portion 96 causes the elastic portion to elastically deform (for example, flexible deform or compressive deform), whereby mounting of the spiral portion 96 to the spring holding shaft 88 is guided.

What is claimed is:

1. A key device comprising:
a rotating member that is rotated by rotation of a key;
an allowing member that is rotated by the rotating member when the rotating member is rotated to a predetermined rotational position;
a regulating member that is a separate and discrete part from the allowing member and disposed at one side of the allowing member, that regulates rotation of the rotating member to the predetermined rotational position by not being rotated together with the allowing member when the rotating member is rotated to the predetermined rotational position, and that allows rotation of the rotating member to the predetermined rotational position by being rotated together with the allowing member when the rotating member is rotated to the predetermined rotational position;
a pair of holding portions that protrude toward another side of the allowing member and toward one side of the regulating member, respectively; and
an urging means mountable on the pair of holding portions for coupling together the regulating member and the allowing member into a subassembly, wherein the urging means retains a side of the regulating member against a side of the allowing member by applying a retaining force along a direction which is substantially orthogonal to the direction that the urging means biases the regulating member.

2. The key device of claim 1, wherein the allowing member and the regulating member are rotatable against the urging force of the urging means.

3. The key device of claim 2, further comprising guiding portions provided at the holding portions, that guide the urging means to the pair of holding portions so that the urging means is held by the holding portions.

4. The key device of claim 2, further comprising a fitting portion that allows the allowing member and the regulating member to fit with each other such that the allowing member and the regulating member are relatively rotatable, and wherein the regulating member and the allowing member are rotatably supported by a shaft, and the shaft penetrates the pair of holding portions, and the fitting portion is formed at least one of the regulating member and the allowing member and is coaxial with the shaft.

5. The key device of claim 2, further comprising protruding portions provided in a subject to which the allowing member, the regulating member and the urging means are assembled, that respectively protrude toward the holding portions to hold the urging means.

6. The key device of claim 1, further comprising guiding portions provided at the holding portions, that guide the urging means to the pair of holding portions so that the urging means is held by the holding portions.

7. The key device of claim 1, further comprising protruding portions provided in a subject to which the allowing member, the regulating member and the urging means are assembled, that respectively protrude toward the holding portions to hold the urging means.

8. The key device of claim 1, wherein the pair of holding portions are formed at the allowing member and the regulating member, respectively.

9. The key device of claim 1, wherein the pair of holding portions are formed at one of the allowing member or the regulating member.

10. The key device of claim 1, wherein the urging means includes a pair of holding members, and the pair of holding members are respectively held at the pair of holding portions.

11. A key device comprising:
a rotating member that is rotated by rotation of a key;
an allowing member that is rotated by the rotating member when the rotating member is rotated to a predetermined rotational position;
a regulating member that is a separate and discrete part from the allowing member and disposed at one side of the allowing member, that regulates rotation of the rotating member to the predetermined rotational position by not being rotated together with the allowing member when the rotating member is rotated to the predetermined rotational position, and that allows rotation of the rotating member to the predetermined rotational position by being rotated together with the allowing member when the rotating member is rotated to the predetermined rotational position;
a pair of holding portions that protrude toward another side of the allowing member and toward one side of the regulating member, respectively;
an urging means mountable on the pair of holding portions for coupling together the regulating member and the allowing member into a subassembly, and a fitting portion that allows the allowing member and the regulating member to fit with each other such that the allowing member and the regulating member are relatively rotatable,
wherein the regulating member and the allowing member are rotatably supported by a shaft, and the shaft penetrates the pair of holding portions, and the fitting portion is formed at at least one of the regulating member and the allowing member and is coaxial with the shaft.

12. The key device of claim 11, wherein the fitting portion includes a fitting concave portion that is formed at one of the allowing member or the regulating member and a fitting convex portion that is formed at the other of the allowing member or the regulating member, and the fitting concave portion and the fitting convex portion are fitted to each other.

13. The key device of claim 11, wherein the pair of holding portions are formed at one of the allowing member or the regulating member, and the fitting portion is a fitting hole that is formed at the other of the allowing member or the regulating member, and the fitting hole and one of the pair of holding portions are fitted to each other.

14. A key device comprising:
a rotating member that is rotated by rotation of a key;
an allowing member that is rotated by the rotating member when the rotating member is rotated to a predetermined rotational position;
a regulating member that is a separate and discrete part from the allowing member and disposed at one side of the allowing member, that regulates rotation of the rotating member to the predetermined rotational position by not being rotated together with the allowing member when the rotating member is rotated to the predetermined rotational position, and that allows rotation of the rotating member to the predetermined rotational position by being rotated together with the allowing member when the rotating member is rotated to the predetermined rotational position;
a pair of holding portions that protrude toward another side of the allowing member and toward one side of the regulating member, respectively, and
an urging means mountable on the pair of holding portions for coupling together the regulating member and the allowing member into a subassembly,
wherein the regulating member and the allowing member are supported by a shaft in a rotatable manner, and the shaft penetrates the pair of the holding portions, and the urging means includes a pair of holding members, and the pair of holding members are respectively held at the pair of holding portions such that the pair of holding members are mounted on outer peripheral surfaces of the pair of holding portions respectively.

* * * * *